Nov. 28, 1939.  D. H. EDWARDS ET AL  2,181,124
TUBE CUTTING APPARATUS
Filed April 14, 1938   5 Sheets-Sheet 2

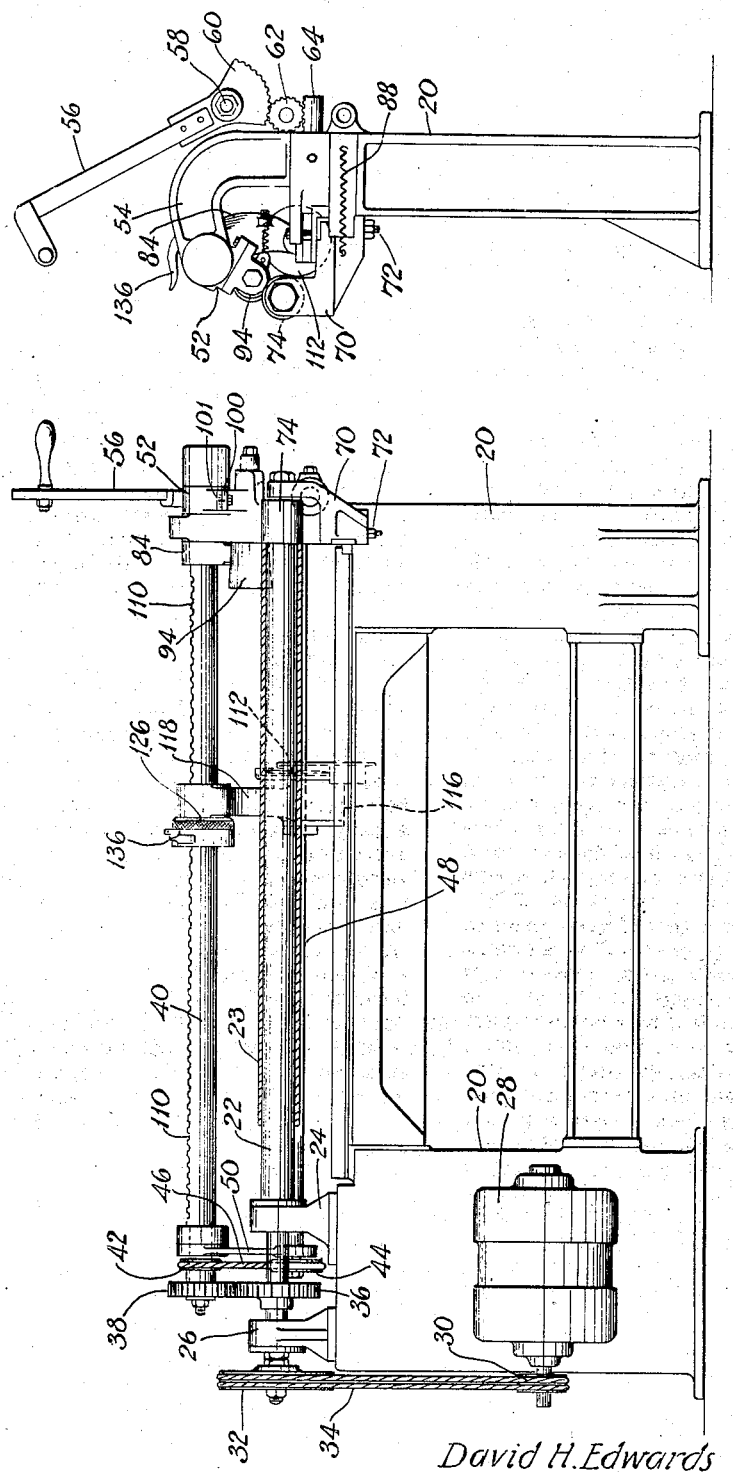

David H. Edwards
Roy E. Hartman
INVENTORS
BY Louis A. Wiebe
ATTORNEY

Nov. 28, 1939.  D. H. EDWARDS ET AL  2,181,124
TUBE CUTTING APPARATUS
Filed April 14, 1938   5 Sheets-Sheet 3
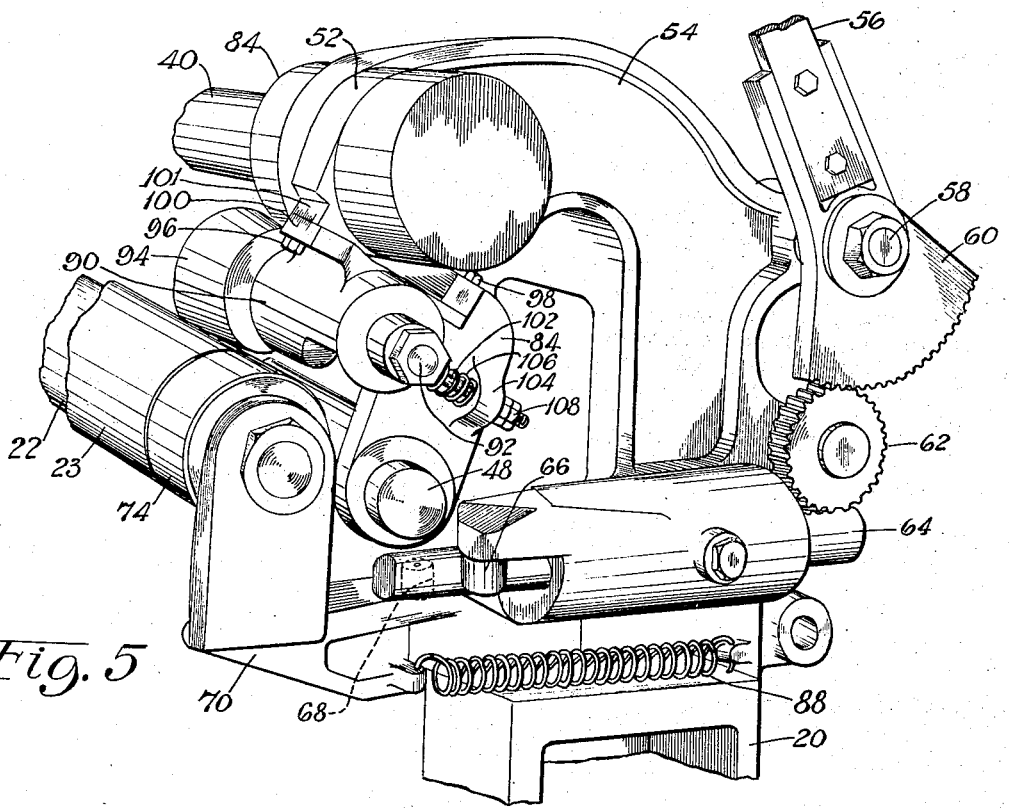
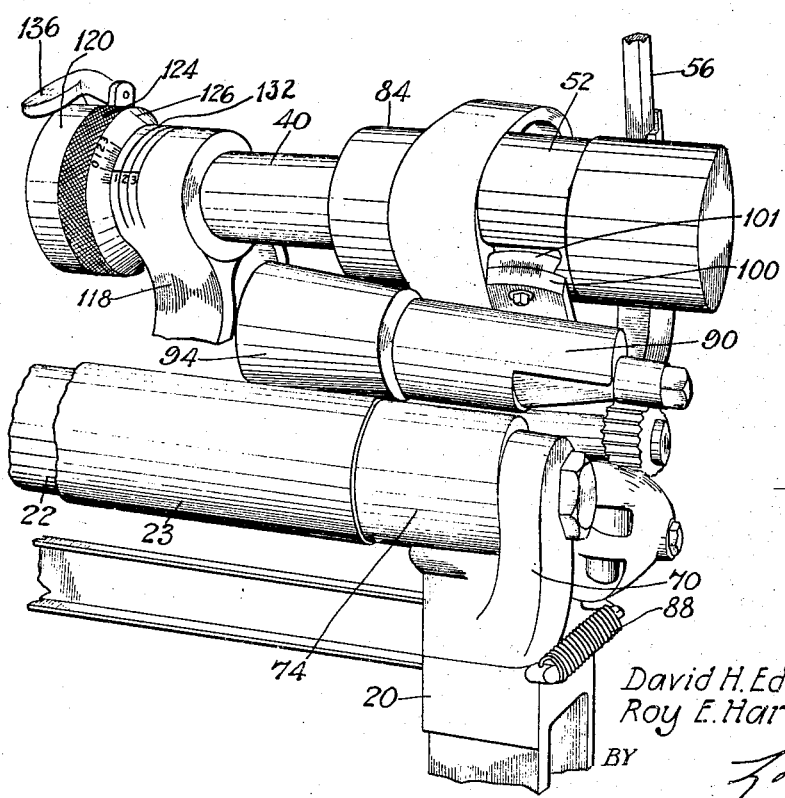
David H. Edwards
Roy E. Hartman   INVENTORS
BY
ATTORNEY Nov. 28, 1939.  D. H. EDWARDS ET AL  2,181,124
TUBE CUTTING APPARATUS
Filed April 14, 1938     5 Sheets-Sheet 4
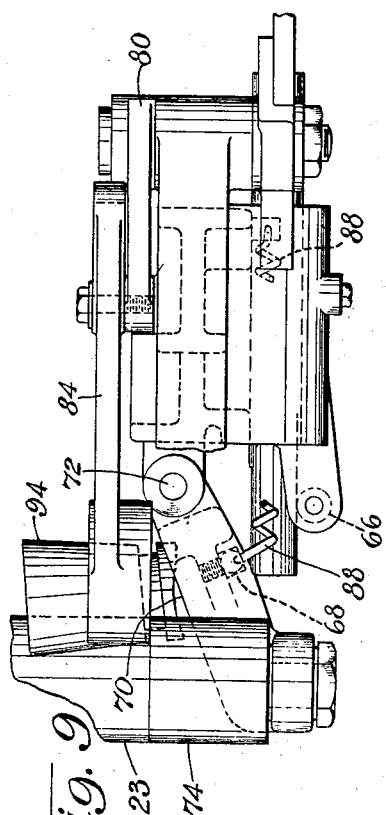
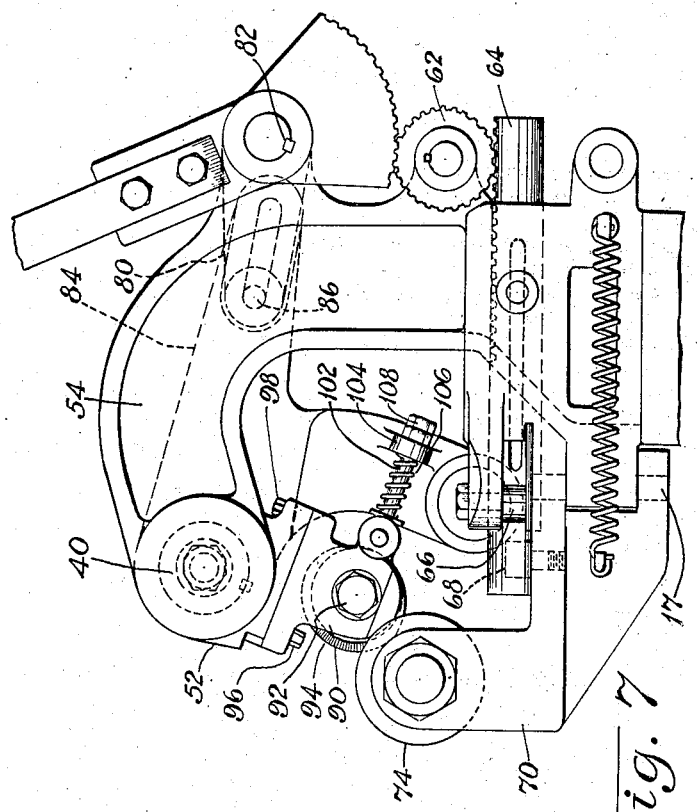
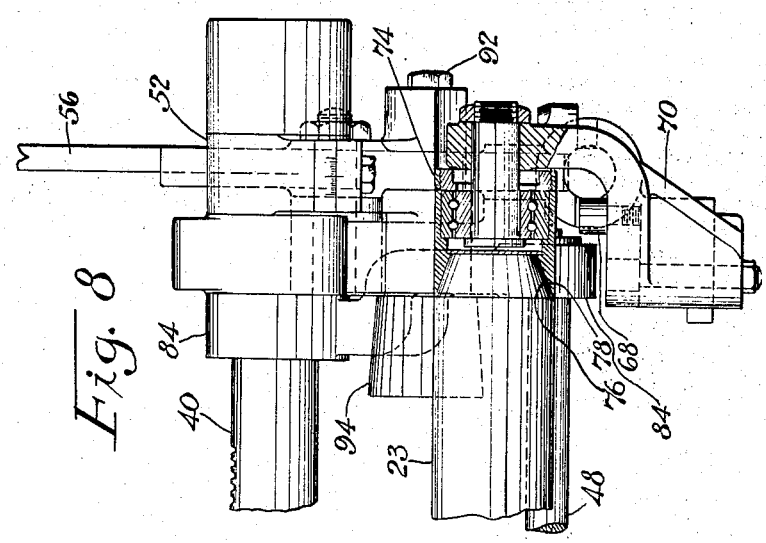
David H. Edwards
Roy E. Hartman  INVENTORS
BY *Louis A. Wiebe*
ATTORNEY Nov. 28, 1939.                 D. H. EDWARDS ET AL                  2,181,124
                                TUBE CUTTING APPARATUS
                                Filed April 14, 1938          5 Sheets—Sheet 5

David H. Edwards
Roy E. Hartman        INVENTORS

BY *Louis A. Wiebe*
                              ATTORNEY

Patented Nov. 28, 1939

2,181,124

UNITED STATES PATENT OFFICE 2,181,124

TUBE CUTTING APPARATUS

David H. Edwards, Kenmore, and Roy E. Hartman, Buffalo, N. Y., assignors to E. I. du Pont de Nemours & Company, Wilmington, Del., a corporation of Delaware Application April 14, 1938, Serial No. 201,862

28 Claims. (Cl. 164—69)

This invention relates to cutting apparatus, and more particularly it relates to apparatus for the cutting of tubular elements such as, for example, laminated paper tubes. There is a great demand for tubes for use in the construction of containers or cores upon which sheet material or textile material in the form of ribbons, tapes or the like may be wound. Such tubes are usually constructed of laminated paper with soft paper inner liners, and are produced in long lengths which must be cut to size. Difficulty has been experienced in cutting such long tubes into uniform lengths with a smoothness of cut and with a cut end which is substantially perpendicular to the axis of the tube. Particular difficulty has been experienced in cutting tubes constructed with soft paper liners without tearing the said liners.

It is, therefore, an object of the present invention to provide an apparatus for cutting tubes, particularly laminated paper tubes, into lengths which will be uniform, which are smoothly cut, and in which the end surfaces are substantially perpendicular to the tube axis.

It is another object of this invention to provide an apparatus which is readily adjustable for the cutting of tubes having any desired length and which will cut such tubing smoothly and with an end which is substantially perpendicular to the tube axis.

It is still another object of this nivention to provide an apparatus which may be operated by an unskilled workman to produce cut tubes of a uniform length and with a smooth cut which is perpendicular to the tube axis.

Other objects of the invention will appear hereinafter.

The details of the invention will be more clearly apparent by reference to the following description taken in connection with the accompanying drawings in which:

Fig. 1 is a front elevational view of an apparatus constructed in accordance with the present invention.

Fig. 2 is a side elevational view of the apparatus shown in Fig. 1.

Fig. 5 is an enlarged perspective view showing a portion of the apparatus substantially from the angle of Fig. 4 but with the end of the mandrel supported by means of a supporting element.

Fig. 6 is an enlarged perspective view taken along the same angle as Fig. 3 and showing a portion of the apparatus with the mandrel in a supported condition.

Fig. 7 is an enlarged end view of the apparatus shown in Fig. 6.

Fig. 8 is an enlarged front view with parts shown in section, of the portion of the apparatus shown in Fig. 7.

Fig. 9 is an enlarged top plane view of the apparatus shown in Fig. 7.

Figure 3:
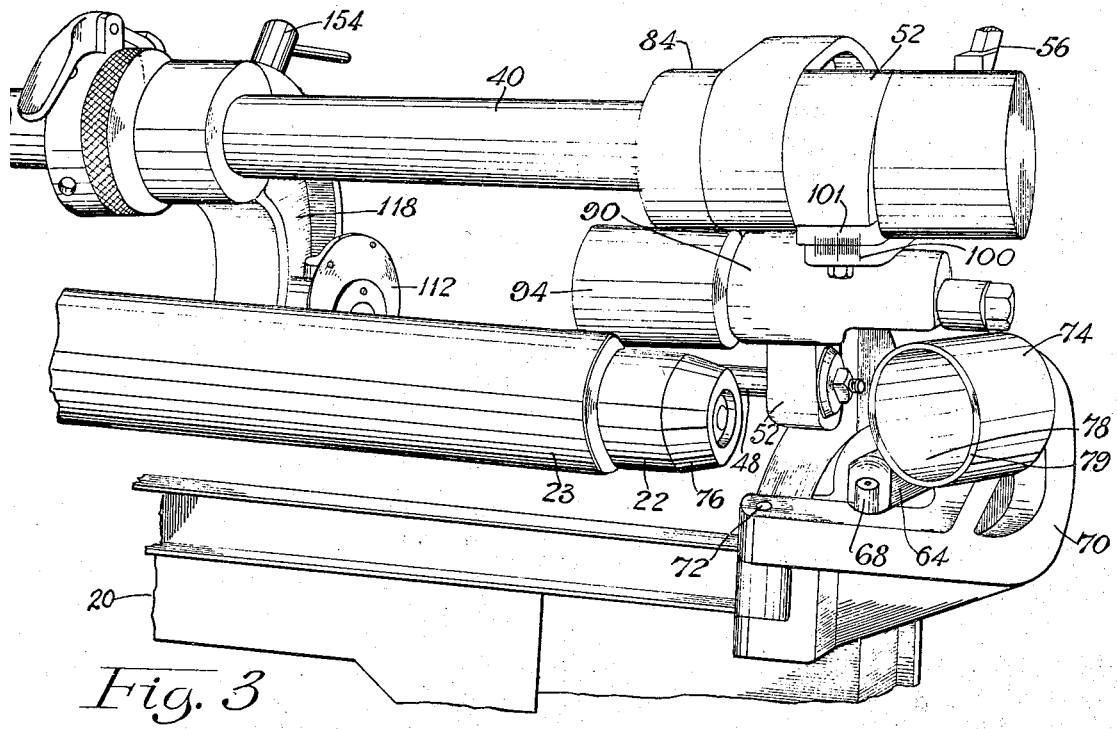
Fig. 3 is an enlarged perspective of a portion of the apparatus showing one end of the mandrel in an open, unsupported condition.

Referring to Fig. 1 of the drawings reference numeral 20 designates the base frame of the tube cutting apparatus. A rotatable mandrel 22 is mounted in bearing supports 24 and 26. A tube 23 is shown mounted on the mandrel. A motor 28 is mounted on the supporting frame of the apparatus. A belt is positioned between motor pulley 30 and pulley 32 mounted on the end of the mandrel. A gear 36 is mounted on the shaft of the mandrel between the supports 24 and 26. A notched spacing bar 40 is mounted over, and slightly to the rear of, mandrel 22. An idler gear 38 is mounted on a sleeve surrounding the end of the spacing bar 40. A pulley 42 is mounted on said idler gear sleeve so that it may be rotated with the idler gear. Another pulley 44 is mounted on one end of the knife shaft 48. A belt, or rope, is positioned between pulley 42 and 44. The spacing bar is supported on the righthand end of the machine by means of a support 54. The knife shaft 48 is connected to the spacing bar 40 by means of a pivotal support 50 and a rotatable bell crank lever 84 at opposite ends of the apparatus. An operating lever 56 is mounted on a stub shaft 58 on the righthand end of the machine. The operating lever 56 is provided with a geared quadrant 60 which is in mesh with an idler pinion gear 62. The pinion gear 62 is in turn positioned to mesh with the teeth of rack 64. The rack 64 is adapted to slide in a housing fixedly mounted on the end of the supporting frame of the apparatus. A roller 66 (see Fig. 5) is positioned in the rack housing and serves to support the end of the rack. A second roller 68 is positioned on a pivoted supporting arm 70. This roller 68 will be contacted by the end and side of rack 64 to cause the supporting arm 70 to swing about its pivot 72. The pivot 72 serves to hinge the supporting arm 70 to the supporting frame of the apparatus. The pivot pin 72 is substantially vertically positioned in the apparatus so as to cause the supporting arm 70 to swing substantially in a horizontal plane. A freely rotatable supporting means for the end of mandrel 22 is mounted on the supporting arm 70. This mandrel support 74 is provided with an end surface 79 which will function as a tube stop for tube 23. The mandrel is preferably provided with a beveled end 76, and the mandrel support 74 is provided with an interior surface 78 conforming substantially to the beveled end 76 of the mandrel. By this arrangement the freely rotatable mandrel support 74 will be rotated by the mandrel 22.

A lever 80 (see Figs. 7, 8 and 9) is keyed to the stub shaft of operating lever 56 by means of key 82. The rotatable bell crank lever 84 is connected to lever 80 by means of a pin 86. The lever 84 is keyed to the notched spacing bar 40. By this arrangement a forward movement of the operating lever 56 will cause the mandrel support 74 to be placed in position over the end of the mandrel 22 and will cause the spacing bar 40 to be slightly rotated and thereby cause the rotatable lever support 84 of the knife shaft to be rotated in a clockwise direction as viewed in Fig. 7.

Figure 4:
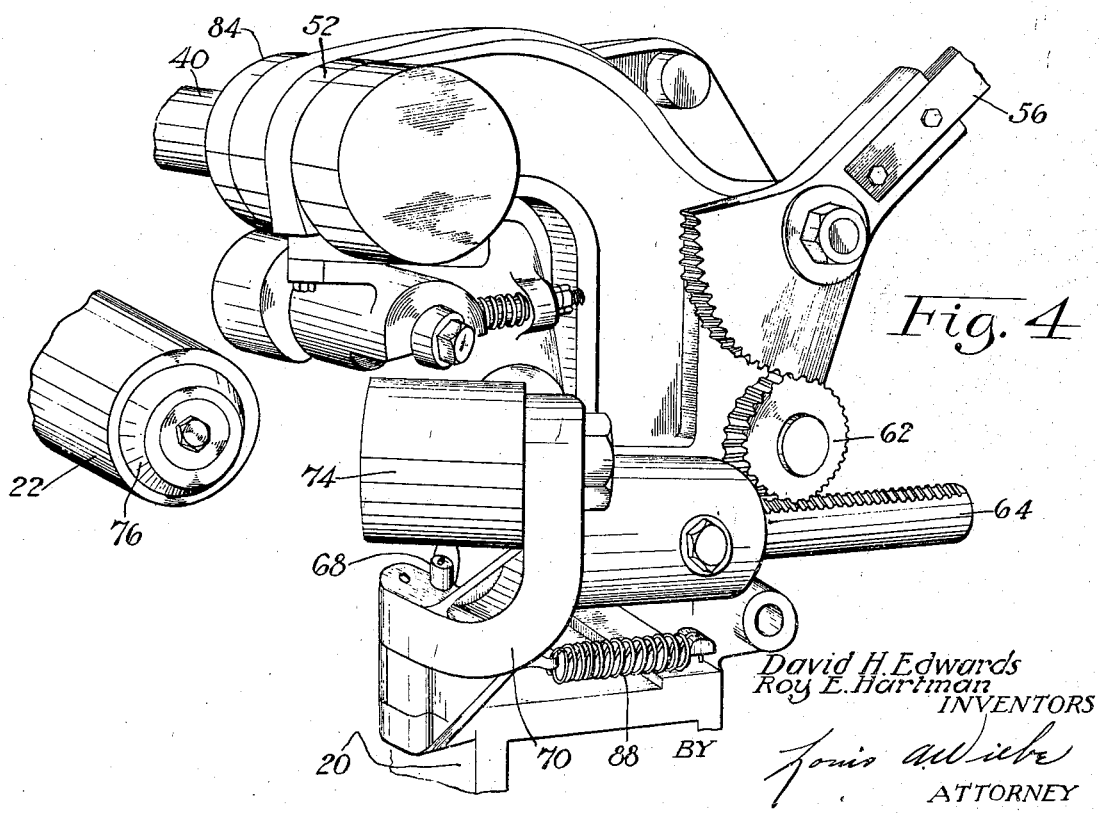
Fig. 4 is an enlarged perspective view showing substantially the apparatus of Fig. 3 but taken at a different angle to show the end of the apparatus.

The coil tension spring 88 is connected to the supporting arm 70 in such a manner that when the rack is withdrawn from its housing the supporting arm 70 will be pivoted about pin 72 to the position shown in Figs. 3 and 4 of the drawings. A stub shaft housing 90 is adjustably connected to rotatable support 52 by means of screws 96 and 98. This will permit the stub shaft 92 and its housing 90 to be adjusted in an angular position. A roller 94, provided with a covering of rubber or the like, is mounted on the stub shaft 92. The roller 94 may be cylindrical or frustroconical as illustrated. The surface 101 of the support 52 and the surface 100 of the housing 90 are provided with cooperable scales so that a fine adjustment of the angularity of stub shaft 92 may be obtained. A pivoted pin 102 is mounted on one end of stub shaft 92 (see Fig. 5 of the drawings). The pin is projected through an opening in a boss 104 which is provided on the rotatable knife support 84. A coil compression spring 106 is provided between the boss 104 and the head of the pivoted pin 102. The end of the pin is threaded and is provided with nuts 108. It will be readily apparent that shaft 92 may be adjustably positioned at an angle to the axis of mandrel 22. The roller 94 will contact tube 23 and will be rotated by the latter. The axes of roller 94 and tube 23 will be at angles to each other and will cause the tube to be moved along the mandrel 22 against the edge 79 of mandrel support 74.

Figure 10:
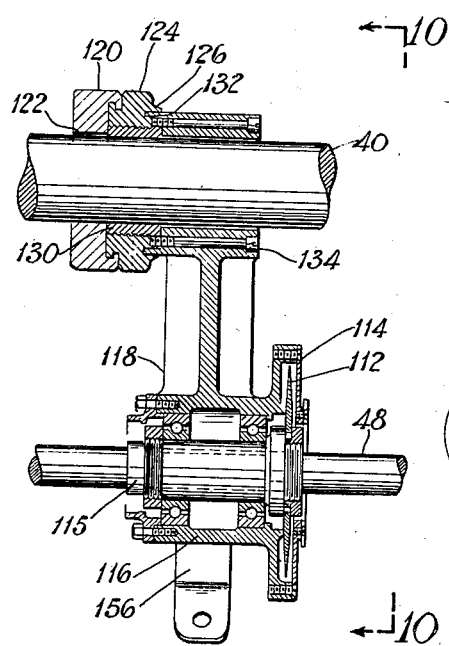
Fig. 10 is an enlarged detail view of the knife assembly, with parts shown in section.
Figure 11:
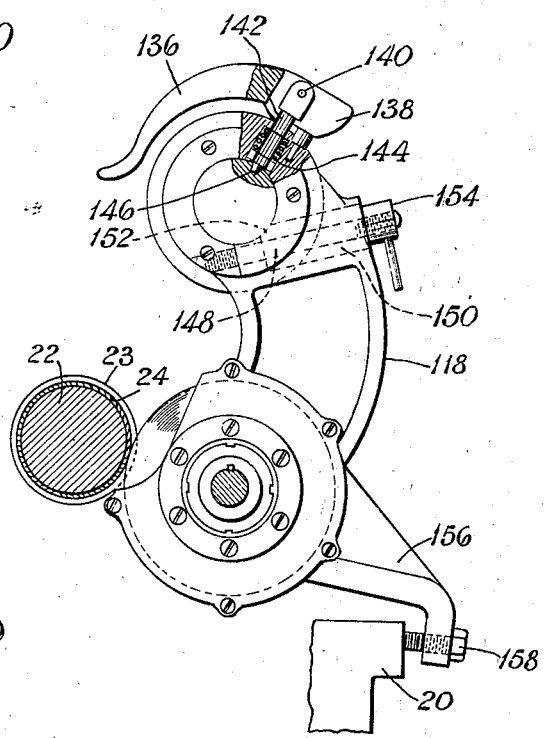
Fig. 11 is an end view of the knife assembly shown in Fig. 10, with parts broken away and shown in section.

The spacing bar 40 is provided with a plurality of notches 110 which notches are spaced from each other a definite predetermined distance, for example ½ inch, within which the knife assembly may be anchored. The knife 112 which is preferably provided with a safety guard 114 is mounted for rotation on the end of a sleeve 115, the latter being keyed to a groove in shaft 48. The sleeve is mounted within a housing 116. This is accomplished as illustrated by means of a pair of ball races positioned on sleeve 115 and a corresponding pair of ball races positioned on the internal surface of the housing 116. By this construction the knife 112, sleeve 115, and shaft 48 may be rotated in the relatively stationary housing 116. The sleeve 115 and its key is free to move longitudinally along grooved shaft 48. The knife housing 116 is connected to an annular element 120 by means of arm 118, sleeve 130 and rotating member 124. The annular element 120 is keyed to bar 40 by means of a cooperating key and key way 122 in such a manner as to permit the movement of the element 120 along bar 40. See Figs. 10 and 11 of the drawings. The rotatable element 124 is rotatably anchored to element 120 and is provided with internal threads. The arm 118 is bolted to an externally threaded extension sleeve 130 by means of bolts 134. The arm 118 is also provided with an externally finished flange 132. The rotatable element is provided with a beveled flange 126 which overlies flange 132. It will thus be apparent that by rotating element 124 the arm 118, together with extension sleeve 130, will be moved relative thereto due to the cooperating threads on 124 and 130. The flanges 126 and 132 will be provided with micrometric scales so that the arm 118 may be adjusted along bar 40 with great accuracy. (Note the cooperating scales on flanges 126 and 132 in Fig. 6 of the drawings.)

A lever 136 having an eccentric cam surface 138 is mounted on the annular element 120, and is provided with a pin 142, which pin is pivoted to lever 136 by means of pivot pin 140. The end 146 of pin 142 is positioned to project into one of the notches 110. A coiled compression spring 144 is positioned about pin 142 to cause the same to be projected into notch 110. The arm 118 is provided with a means for locking the same to bar 40. This means is comprised of threaded rod 148, wedge block 150 and nut 154. By tightening the nut 154 the wedging edge 152 of the wedge block 150 is forced into engagement with bar 40. To the housing 116 is connected a projecting member 156 which in turn is provided with an adjusting screw 158 for contact with a portion of the supporting frame of the apparatus. This serves to prevent the knife from cutting into mandrel 22. The mandrel 22 is preferably provided with a covering 24 of rubber or composition which may be replaced and into which the knife may project slightly (see Fig. 11 of the drawings).

The operation of the apparatus will be somewhat as follows:

The mandrel 22 is rotated by means of motor 28 through belt 34 and pulleys 30 and 32. The knife shaft 48 is rotated through gears 36 and 38 and through pulleys 42 and 44 and belt 46.

The operating lever 56 is positioned rearwardly thereby causing the rack 64 to be drawn towards the rear of the machine. Upon drawing the rack 64 rearwardly the roller 68 will move from the side of the rack to the end thereof and will thereby allow the tension spring 88 to withdraw the supporting arm 70 away from the mandrel to the position shown in Figs. 3 and 4. This will permit the positioning of a tube 23 onto the mandrel 22. The knife assembly is loosened on bar 40 by loosening the nut 154 and lifting the extraction lever 136. The knife assembly is slid along bar 40 and knife shaft 48 to any desired position. The extraction lever 136 is released thereby permitting spring 144 to project pin 142 into one of the notches 110. A fine adjustment can now be made by means of rotatable element 124 which can be measured by micrometer scales on surfaces 126 and 132. After making the desired adjustment arm 118 is locked in a fixed position on bar 40 by means of nut 154. The operating lever is now pulled forward causing the rotatable mandrel support 74 to engage the end of mandrel 22. The roller 94 will now be positioned against tube 23 with axis of roller 94 at an angle to the axis of tube 23. The roller 94 being freely rotatable will rotate with the tube 23 and mandrel 22 and thereby cause a drawing or longitudinal moving of the tube towards the mandrel supporting roller 74. The longitudinal movement of the tube will be stopped as soon as it contacts the edge 79 of mandrel support 74. As the operating lever continues to move forward the rapidly rotating edge of the knife will be forced against the rotating tube, causing it to be cut. The knife is preferably provided with a very gradually beveled edge so that the end of the tube cut will be substantially perpendicular to its axis.

The type of material of which the tubes to be cut are prepared will govern the conditions of wear of roller 94 and will also determine the optimum angularity of the shaft of this roller with the axis of the mandrel. If desired the roller 94 may be positively driven.

The function of the roller 94 is very important in the operation of the tube cutting apparatus. Its movement is so related to that of the tube stop and mandrel supporting means that it comes into contact with the tube immediately after the mandrel support engages the end of the mandrel, so that the tube is positively driven against the tube stop and held there before any cutting occurs. This insures both an accurately placed as well as a smooth cut since the axial position of the tube cannot shift during the cutting operation. Since the core is automatically positioned against a stop, it permits operation of the cutting apparatus by an unskilled operator at a consequent saving.

The relative direction and rates of rotation of the knife and mandrel as well as the relative peripheral speeds of the knife edge and surface of the tube throughout the cutting operation will govern the character of the cut obtained. The knife and mandrel may be rotated in the same or opposed directions and at various rates of speed relative each other. The mandrel is shown as rotating in a direction opposite to that of the knife. With this combination, it is preferred to drive the knife with a peripheral speed approximately 30 percent greater than that of the peripheral speed of the tube. In this manner of operation, the peripheral speed of the knife, even after long periods of normal wear and resharpening still exceeds that of the tube and thus helps to drive the tube, and to impart a sheer cut rather than a score cut to the tube. The choice of other directions and speeds of rotation of the tube and knife depends upon the nature of the tube to be cut, and the type of cut desired, etc.

Obviously, a plurality of knife assemblies can be mounted on bar 40 and knife shaft 48 to be driven simultaneously to cut the tube at a plurality of points.

By means of the above-described tube cutting apparatus it is possible to adjust the apparatus very readily to cut tubing of any desired length. It is also possible to consistently cut tubes of uniform length. Furthermore, the above-described apparatus may be operated by an unskilled operator to produce very desirable and constant results.

As a further advantage pieces of tubing which have been cut to a specified length can be removed from apparatus constructed in accordance with this invention without removing the uncut remaining portion of the tube.

By constructing tube cutting apparatus in accordance with the present invention use is made of a cutting blade having a slight bevel on both sides to produce a cut in a tube which will be accurate and sufficiently square on both sides of the cut to permit employment of the tubing for the most critical uses.

Since it is obvious that many changes and modifications of the above-described apparatus can be made without departing from the nature and spirit of the invention, it is to be understood that the invention is not to be limited except as set forth in the appended claims.

We claim:

1. In a tube cutting apparatus, a mandrel for supporting a tube in cutting position, means for rotating said mandrel and tube, a freely rotatable tube stop means adapted to rotate with said tube and mandrel, and a cutting knife adapted to be moved transversely against said rotating tube.

2. In a tube cutting apparatus, a mandrel for supporting a tube in cutting position, means for rotating said mandrel and tube, a freely rotatable tube stop means adapted to rotate with said tube and mandrel, and a rotatable cutting knife adapted to be moved transversely against said rotating tube.

3. In a tube cutting apparatus, a mandrel for supporting a tube in cutting position, means for rotating said mandrel and tube, a freely rotatable tube stop means adapted to rotate with said tube and mandrel, and a rotatably driven cutting knife adapted to be moved transversely against said rotating tube.

4. In a tube cutting apparatus, a mandrel for supporting a tube in cutting position, means for rotating said mandrel and tube, a freely rotatable tube stop means adapted to rotate with said tube and mandrel, a rotatably driven cutting knife adapted to be moved transversely against said rotating tube, said rotatably driven cutting knife pivotally mounted relative to said tube.

5. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and means for accurately spacing said cutting knife from said tube stop means.

6. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and adjustable means for accurately spacing said cutting knife from said tube stop means.

7. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and micrometrically adjustable means for accurately spacing said cutting knife from said tube stop means.

8. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and means for forcing said tube against said tube stop means.

9. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and angularly adjustable means for forcing said tube against said tube stop means.

10. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and rotatable means for forcing said tube against said tube stop means.

11. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and freely rotatable means adapted to be forced against said tube whereby to force said tube against said tube stop means.

12. In a tube cutting apparatus, a mandrel for supporting a tube in cutting position, means for rotating said mandrel and tube, a freely rotatable tube stop means adapted to rotate with said tube and mandrel, a cutting knife adapted to be moved transversely against said rotating tube, and rotatable cylindrical means adapted to be forced against said tube with the axes of the said means and tube at an angle to each other whereby to force said tube against said tube stop means.

13. In a tube cutting apparatus, a rotatable mandrel for supporting a tube in cutting position, a freely rotatable supporting element for one end of said mandrel, said supporting element being recessed to receive the end of the mandrel which it supports, and means for moving said supporting element into and out of engagement with said mandrel.

14. In a tube cutting apparatus, a rotatable mandrel for supporting a tube in cutting position, a freely rotatable supporting element for one end of said mandrel, and pivotal means about which said supporting element is adapted to pivot for moving said supporting element into and out of engagement with said mandrel.

15. In a tube cutting apparatus, a rotatable mandrel for supporting a tube in cutting position, a freely rotatable supporting element for one end of said mandrel, and pivotal means for moving said supporting element into and out of engagement with said mandrel, said mandrel and said supporting element having cooperatively conforming surfaces for engagement with each other whereby said element will be rotated by said mandrel.

16. In a tube cutting apparatus, a rotatable mandrel for supporting a tube in cutting position, a freely rotatable supporting element for one end of said mandrel, and vertically positioned pivotal means for moving said supporting element in a horizontal plane into and out of engagement with said mandrel.

17. In a tube cutting apparatus, a rotatable mandrel for supporting a tube in cutting position, a freely rotatable supporting element for one end of said mandrel, vertically positioned pivotal means for moving said supporting element in a horizontal plane into and out of engagement with said mandrel, and rack and gear means for moving said supporting element about said pivotal means.

18. In a tube cutting apparatus, a rotatable mandrel for supporting a tube in cutting position, a freely rotatable supporting element for one end of said mandrel, said supporting element having a tube stop surface adapted to rotate in substantial unison with said tube, and means for moving said supporting element into and out of engagement with said mandrel.

19. In a tube cutting apparatus, a rotatable mandrel for supporting a tube in cutting position, a pivotally mounted, freely rotatable supporting element for one end of said mandrel, an operating lever, and means connecting said supporting element to said lever in such a manner that upon operation of said lever said element is pivotally moved into and out of engagement with said mandrel.

20. In a tube cutting apparatus, a rotatable mandrel for supporting a tube in cutting position, a pivotally mounted, freely rotatable supporting element for one end of said mandrel, a tube stop surface on said element, means for drawing said tube along said mandrel against said tube stop surface, an operating lever, and means connecting said operating lever to said supporting element and said tube drawing means in such a manner that upon operation of said lever said element and said drawing means are successively moved into engagement with said mandrel and said tube respectively.

21. In a tube cutting apparatus, a rotatable mandrel for supporting a tube in cutting position, a knife assembly supporting shaft, said knife assembly movable longitudinally along said shaft, means for locking said assembly onto said shaft at any predetermined position along the length thereof, and means in said assembly for moving the knife relative to the locked portion of said assembly.

22. In a tube cutting apparatus, a rotatable mandrel for supporting a tube in cutting position, a knife assembly supporting shaft, said knife assembly movable longitudinally along said shaft, means for locking said assembly onto said shaft at any predetermined position along the length thereof, and micrometrically adjustable means in said assembly for moving the knife relative to the locked portion of said assembly.

23. In a tube cutting apparatus, a rotatable mandrel adapted to closely fit and support a tube in cutting position, a freely rotatable supporting element for the open end of said mandrel, said supporting element carrying tube stop means adapted to limit the lengthwise movement of a tube on the mandrel, cutting means adapted to be moved against a tube on the mandrel to sever the same, and rotatable means adapted to be forced against said tube for forcing the same into contact with said tube stop means.

24. In a device of the kind claimed in claim 23, a means adapted to move said mandrel supporting element into mandrel supporting position and said tube forcing means into contact with said tube.

25. In a device of the kind claimed in claim 23, a means adapted to move said mandrel supporting element into mandrel supporting position and thereafter to move said tube forcing means into contact with said tube.

26. In a tube cutting apparatus, a rotatable mandrel adapted to closely fit and support a tube in cutting position, a freely rotatable supporting element for the open end of said mandrel, said supporting element carrying tube stop means adapted to limit the lengthwise movement of a tube on the mandrel, cutting means adapted to be moved against a tube on the mandrel to sever the same, and rotatable means adapted to be forced against said tube for forcing the same into contact with said tube stop means, a means adapted to move said mandrel supporting element into mandrel supporting position and said tube forcing means into contact with said tube, said cutting means and said tube forcing means being pivotably mounted on the same axis.

27. In a device of the kind claimed in claim 26, a shaft upon which the said cutting means, the said tube forcing means and an idler pulley unit are mounted, the said idler pulley unit being driven by the mandrel drive and driving the rotatable shaft upon which the cutting means is mounted.

28. In a tube cutting apparatus, a rotatable mandrel adapted to closely fit and support a tube while it is being cut, a freely rotatable support for the open end of said mandrel, tube stop means for limiting the travel of tube toward the open end of the mandrel, a shaft extending in the direction of the mandrel upon which is pivotably mounted a carriage for a tube cutting means mounting and an arm carrying a rotatable, angularly adjustable means adapted to force the tube against said tube stop means, said carriage being slidable on said shaft and having means to locate it thereon in a given position, said carriage having means for adjusting the cutting means mounting thereon in a direction lengthwise of the tube, and means on said cutting means mounting for securing the carriage and cutting means mounting to the said shaft in a fixed position.

DAVID H. EDWARDS.
ROY E. HARTMAN.